United States Patent [19]

Feibush et al.

[11] Patent Number: 4,933,372

[45] Date of Patent: Jun. 12, 1990

[54] POROUS RIGID RESINS AND PROCESS OF PREPARATION

[75] Inventors: Binyamin Feibush, State College, Pa.; Nai-Hong Li, Baltimore, Md.

[73] Assignee: Supelco, Inc.

[21] Appl. No.: 433,623

[22] Filed: Nov. 7, 1989

Related U.S. Application Data

[62] Division of Ser. No. 249,762, Sep. 26, 1988.

[51] Int. Cl.$^5$ ................................................ C08J 9/26
[52] U.S. Cl. ......................................... 521/91; 521/61;
521/92; 521/122; 521/123; 521/146; 521/149; 521/150
[58] Field of Search ............... 521/61, 91, 92, 122, 521/123, 146, 149, 150

[56] References Cited

U.S. PATENT DOCUMENTS 1,113,630 10/1914 Hofmann et al. .................. 526/220
3,007,896 11/1961 Clasen .................................... 521/61

Primary Examiner—Morton Foelak

[57] ABSTRACT

Porous, rigid resin particles are prepared having a predetermined particle size distribution, surface area and porosity by polymerizing in the pores of porous inorganic template particles a reaction mixture comprising monovinyl monomers, polyvinyl crosslinking monomers and a polymerization initiator in a liquid medium in which the monomers and initiator are phase separable and extractable therefrom into the pores of the template particles. The extracted mixture is polymerized in the pores of the template particles, and the template particles are removed without destruction of the polymerizate. The isolated polymerizate mirrors the characteristics of the template particles. The surface of the polymerizate may be modified in various ways to contain desired functionality. The particles of the invention are useful in chromatography, adsorption, ion exchange, and in catalysis.

16 Claims, 2 Drawing Sheets

4,933,372

POROUS RIGID RESINS AND PROCESS OF PREPARATION

This is a division of application Ser. No. 249,762, filed Sept. 26, 1988, now allowed.

TECHNICAL FIELD

This invention relates to resins useful in chromatographic analysis and preparative high performance liquid chromatography, and as polymeric reagents including adsorbents and polymeric catalysts. The invention further relates to processes for preparing and modifying the surface characteristics of the resins, based upon a templating technique.

BACKGROUND OF THE INVENTION

The ability to reproducibly synthesize porous, rigid resins which are chemically stable to organic solvents over a wide pH range and which have a desired shape, size, porosity and surface area, has substantial commercial importance. The value is further enhanced if the resins can be modified to provide functionality suitable for ion exchange or other reactivity. One such technique is based upon use of inorganic particles having a desired size, surface area and porosity to extract the reactive components from a reaction mixture placed in contact with the inorganic particles, followed by polymerization of reactants within the pores of the inorganic particles and removal of the inorganic particles without destruction of the polymerizate. Theoretically, at least, the isolated polymerizate should mirror the size, surface area and porosity of the inorganic particles.

U.S. Pat. No. 4,263,268 to Knox and Gilbert describes a method of preparing porous carbon by depositing a polymerizable mixture in the pores of a porous inorganic template such as silica gel, polymerizing the mixture, pyrolyzing the resulting polymer, and dissolving the template material. This work is also reported in LC/GC 5 No. 2. (1987) 165.

U.S.S.R. Invention Description With Authors Certificate No. 208942, published Jan. 17, 1968, describes a method of preparing macroporous ion exchange resins by copolymerizing styrene with divinyl benzene in a porous matrix such as silica gel having a surface area of 20–300 $m^2/g$, an average pore diameter of 100–150 Angstroms, and a particle size of 1–2 mm. The resulting swollen particles are transferred to a saturated $CaCl_2$ solution and the temperature raised to 70° C. for 4–5 hours. The silica gel particles containing the copolymer are then combined with dichloroethane and heated for 30 minutes at 70° C. The dichloroethane is washed out with ethyl ether and the resulting beads are allowed to stand 2–3 hours in an NaOH solution. The alkali is washed off the beads with distilled water and the beads are dried. The porosity of the resulting copolymer beads, determined by acetone, is 0.5 $cm^3/g$, and the specific area measured by BET is 150–200 $m^2/g$. The beads may be ion exchange functionalized by sulfonation in the usual manner.

The process of the U.S.S.R. publication appears to be a bulk copolymerization, the dichloroethane operating as an inert solvent and precipitant to dissolve the monomers but not the copolymer. The large proportion of monomers relative to the silica gel suggests that agglomeration is taking place. Moreover, the silica gel appears to be a conventional hydrophilic material and thus is incompatible with the hydrophobic monomers. Still further, the very large particle size of the silica gel indicates that the copolymer particles, once separated from the silica gel by treatment with the caustic, could not be used for high-performance chromatography. In any event, the pore volume of the silica gel is not given and therefore the efficiency of the copolymerization and the extent to which the copolymer mirrors the particle size and pore diameter of the silica gel cannot be determined.

SUMMARY OF THE INVENTION

It has now been found, in accordance with one aspect of the invention, that porous rigid resin particles can be prepared with little or no loss of product by agglomeration and having particle-size distribution, surface area and porosity of virtually any predetermined values, by polymerizing in the pores of porous inorganic template particles a reaction mixture comprising monoethylenically unsaturated monomers, polyethylenically unsaturated crosslinking monomers and a polymerization initiator, in a liquid medium in which the monomers and initiator are phase separable and extractable therefrom into the pores of the template particles. Following the copolymerization, the template particles are removed without destroying the copolymer, with the result that the isolated copolymer particles mirror the size, surface area and porosity of the template particles.

In another aspect of the invention, the volume of the reaction mixture is approximately equal to the pore volume of the inorganic template particles, to further reduce agglomeration and to increase the yield of desirable product.

In other aspects of the invention, desired functionality is provided on the surface of the copolymer resin particles in several ways, including (1) absorption onto the surface of the template particles of an ethylenically unsaturated compound carrying additional desired functionality, followed by bonding of the compound to the copolymer during polymerization and removal of the template particles; (2) providing in the reaction mixture a compound carrying the desired functionality, the template particles being modified with functional groups capable of associating with the functionality of the compound, whereby the functional groups are populated on the surface of the copolymer particles; and (3) by chemically bonding an ethylenically unsaturated compound containing the desired functionality onto the template particles, the functionality then being transferred to the copolymer, followed by removal of the template particles.

The invention is applicable to copolymers based upon hydrophobic monomers, hydrophilic monomers, and to monomers carrying other functionality, to yield porous, rigid resins which mirror the size, surface area, and porosity of the template particles. The template particles thereby predetermine the fields of application of the copolymer particles, with modification of the particles as required, such fields including chromatographic analysis and preparative techniques, adsorbents, catalytic materials, polymeric reagents, and a wide variety of ion exchange resins. Because the controlling factor is the character of the template particles, particulate resins can be produced having specific particle properties selected within a wide range of particle size, porosity and pore size, thus avoiding the additional step and associated cost of classifying resinous particulate products according to desired characteristics. However, in cases where further classification is still desired, the

DETAILED DESCRIPTION

The invention is applicable to any copolymers prepared from mixtures of monoethylenically and polyethylenically unsaturated monomers which are copolymerizable in the liquid state. The monoethylenically unsaturated monomers include vinyl monomers such as vinylaromatic and vinylaliphatic monomers. Representative of vinyl monomers are aromatic monomers such as styrene and substituted styrenes, including methylstyrenes, ethylstyrenes, the various dialkyl-styrenes, chloromethylstyrene, isopropenyltoluene, vinylnaphthalene, vinylanisole, vinylxylene, and vinylpyridine, vinyl acetate, vinyl propionate, and any mixture thereof, and acrylic monomers, including the alkyl ($C_1$-$C_8$) esters of acrylic or methacrylic acid, such as methyl acrylate, ethyl acrylate, propyl acrylate, isopropyl acrylate, butyl acrylate, tert-butyl acrylate and ethylhexyl acrylate, and others, including cyclohexyl acrylate, isobornyl acrylate, benzyl acrylate, phenyl acrylate, alkyl ($C_1$-$C_9$)phenyl acrylate, ethoxymethyl acrylate, ethoxyethyl acrylate, ethoxypropyl acrylate, propoxymethyl acrylate, propoxyethyl acrylate, ethoxyphenyl acrylate, ethoxybenzyl acrylate, the corresponding methacrylic acid esters, and other monomers such as N-2-(N-ethylperfluorooctanesulfonamide)ethyl methacrylate. The preferred acrylic esters are the lower aliphatic esters of acrylic acid in which the ester group contains 1–5 carbon atoms, such as ethyl acrylate and the various butyl acrylates.

Suitable polyethylenically unsaturated crosslinking monomers include divinylbenzene, divinylpyridine, divinyltoluenes, divinylnaphthalenes, ethylene glycol dimethacrylate, glycidyl methacrylate, triallyl isocyanurate, pentaerythritol trimethacrylate, divinylxylene, divinylethylbenzene, divinylsulfone, divinylketone, divinylsulfide, trivinylbenzene, trivinylnaphthalene, trimethylolpropane trimethacrylate, polyvinylanthracenes and the polyvinyl ethers of glycol, gylcerol, pentaerythritol and resorcinol. Particularly preferred crosslinking monomers are the polyvinylaromatic hydrocarbons such as divinylbenzene, the glycol dimethacrylates such as ethylene glycol dimethacrylate, and the polyvinyl ethers of polyhydric alcohols, such as divinyloxyethane and trivinyloxypropane.

As evident from the foregoing, the monomers may be hydrophobic or hydrophilic, or carry other functionality both polar and non-polar, including sites for subsequent attachment of ion exchange functionality. In the case particularly of hydrophobic monomer systems, desired functionality may be provided on the surface of the copolymer by the techniques described below. However, in all monomer systems of the invention, the monomers, initiator and liquid suspension medium are selected such that the monomers and initiator are phase separable from the medium, and thereby extractable into the pores of the template particles. In effect, the monomers and initiator are selected for compatibility with the template particles and incompatibility (insolubility or diminished solubility) with the liquid suspension medium, in order to facilitate good extraction of monomers and initiator into the pores of the template particles for polymerization therein.

Generally, phase separation requires that the liquid medium for the polymerization be aqueous in the case of hydrophobic monomers and non-aqueous in the case of hydrophilic monomers. However, some water may be present in the polymerization reaction mixture when one or more of the monomers are hydrophilic, provided the hydrated hydrophilic monomers are only slightly soluble in the reaction medium.

Most free radical initiators useful for suspension or emulsion polymerization (subject to the limitation that both the monomers and the initiator are phase separable from the liquid reaction medium) may be employed, including both the peroxy and azo types. Suitable initiators are the organic peroxides such as benzoyl peroxide, peroxyesters such as t-butyl peroxybenzoate and the various t-amyl peroxyesters, and dicumyl peroxide. Azo initiators include azo-bis-isobutyronitrile. The amount of initiator is readily selected by one skilled in the art, and is typically about 0.1–2.0%, based on the weight of the monomers.

Typically, non-aqueous liquid reaction media include various inert organic solvents such as halogen substituted hydrocarbons, aliphatic and aromatic hydrocarbons. Representative hydrocarbons include isooctane, toluene, ethylene chloride and chloroform.

The template particles for preparing the particulate resins of the invention generally are porous, inorganic materials such as silica gel, silica, alumina, zirconia, minerals or refractory materials such as glassy substances, and the various metal oxides. Silica gels are preferred because they are available in a wide variety of forms having uniform characteristics including particle size, surface area and porosity.

The template particles may, if not inherently compatible, be modified or treated to provide the requisite compatibility with the monomer/initiator reaction mixture for effective extraction into the pores of the template material. For example, if the monomer system is essentially hydrophobic, and silica gel is the template material, the silica gel may be treated with a reagent capable of rendering it hydrophobic. Techniques for effecting this transformation are known, and include the use of silanizing agents such as trimethyl chlorosilane, hexamethyldisilazane and other dimethylalkylchlorosilanes in which the alkyl substituent may contain from one to about eighteen carbon atoms, preferably about one to four carbon atoms. Treatment with higher alkyl homologs of the silanizing reagent may leave residues and create a need for more extensive extractions of the polymeric product.

The foregoing techniques for converting a hydrophilic silica gel surface to a hydrophobic surface are described in Iler, *The Chemistry of Silica*, pages 680–702, incorporated herein by reference. A silanizing agent may be represented by the formula $X_mSi(R)_nR'_{4-(m+n)}$ wherein R may be alkyl or aryl, R' is an alkyl, usually methyl or ethyl, the sum of m and n is not greater than 4, and X is a replaceable group such as Cl, $OCH_3$, $OC_2H_5$, $NR_2$, NHCOR or the like. Alkyl in the foregoing formula may contain 1–18 or more carbon atoms, more usually 1–4 carbons atoms, and aryl may contain 6–18 carbon atoms and includes alkaryl groups or aralkyl groups such as tolyl and benzyl.

Other techniques may also be used to convert the hydrophilic silica gel surface to a hydrophobic surface, such as heating the silica gel with an alcohol (ROH) to convert the surface silanol groups to Si—O—R groups, and the adsorption of certain surfactants such as a surfactant based pm $(CH_3)_3{}^+N(CH_2)_nCH_3$ and the like.

In preparing the resins of the invention, a reaction mixture is formed of the unsaturated monomers, polyethylenically unsaturated monomers and polymerization initiator in a liquid state where the volume of the reaction mixture approximately equals the pore volume of the template particles. To this mixture the template particles are added with suitable agitation. This contact results in extraction of the monomers and initiator into the pores of the template particles without undue agglomeration. The kinetics of the extraction will depend primarily upon the nature of the reaction mixture, liquid medium and template particles.

In some cases, enhancement of the extraction can be achieved, particularly in the case of polar monomers such as vinyl acetate, by addition of a salt to the aqueous suspension medium.

In the case of monomers with a polyether type backbone, these monomers being soluble in organic solvents when anhydrous, addition of a small amount of water to the reaction mixture will cause the monomers to separate and to improve the extraction of the monomers into a hydrophilic template material. Generally, therefore, the addition of small amounts of water will improve the extraction of hydrophilic monomers into a hydrophilic template material when the liquid medium comprises a nonpolar suspending solvent.

While the addition of a volume of reaction mixture approximately equal to the pore volume of the template particles is useful for avoiding substantial agglomeration of the polymerizate, agglomeration can also be minimized by the use of monomers that form water wettable polymers and by the use of additives which will adsorb to the interface of organic/water systems but preferably will not form micelles. A typical reagent of this type is butyl sulfonate.

After extraction of the reaction mixture into the pores of the template particles, the mixture is heated to a temperature which activates the initiator present in the reaction mixture, in order to effect the polymerization and crosslinking. In some cases, as where a low-temperature initiator is used, it may be desirable to re-treat the mixture of reactive monomers and template particles with a higher-temperature initiator, and heat the mixture to the activating temperature of that initiator. This will significantly improve the rigidity of the resin particles in many cases.

Upon completion of the polymerization reaction, the template matrix is removed from the crosslinked copolymer, normally by dissolution of the template material. If the template material is silica, contact with an aqueous alkaline solution will effectively dissolve the silica. An alkaline solution having a pH of at least 12 is particularly effective to remove silica but lower alkalinity will be effective dependent upon treatment time and temperature.

Aqueous hydrogen fluoride solutions are also effective in removing silica, alumina and other inorganic template materials, and this approach is particularly effective when the template material has been modified, as by the various silanization techniques described above.

After removal of the template material, the particulate resin product may be filtered and washed with water, usually to neutrality, treated with a water soluble alcohol such as methanol, and dried. The isolated copolymer particles will generally mirror the size, surface area and porosity of the template particles.

If the template particles comprise silica gel, a wide range of surface areas, pore volumes and densities can be produced in the resin particles. In particular, by using silicas that have a more uniform pore structure, the properties of the templated resin become more predictable. It is thus possible to calculate an expected surface area, pore volume, size distribution and other properties from characteristics of a template material. For example, surface area can be calculated from the formula $$S_r = S_s \left( \frac{1}{V_g d_m} \right),$$

where $S_r$ and $S_s$ are the surface areas of the resin product and the silica, respectively, $V_g$ is the pore volume per gram of silica, which is equal to the volume of monomers used, and $d_m$ is the density of the monomer mixture. Moreover, since the pore matrix of the template material becomes the resin matrix and vice versa, the template matrix forms the resin pore structure. A measurement of the pore volume and matrix volume of the template material and the density of the monomers mixture used will enable calculation of the expected pore volume per unit weight of the resin product. In cases where polymerization is associated with a volume decrease from the monomeric mixture, larger pores than calculated are obtained. The polymer obtained from Series 82 silica, using the procedure of Example 2 below, gave larger pores than expected, as indicated by its exclusion separation properties (See FIG. 2), while the packing of Example 12 below gave approximately the expected pore size distribution (See Table 2 under note g). The pyridyl pendant groups of Example 12 adsorb to the template surface and reduce bulk shrinkage. If the polymerization conditions are such that micropores are formed in the resin product, the resulting resin surface area will be greater than calculated. However, if a silica template is used which has a large fraction of micropores, the surface area of the resin product may be less than calculated because the enclaved polymer smoothes over some of the microporosity or roughness of the template surface. Agglomeration of the resin product during the polymerization can be further minimized by addition of a protective colloid such as polyvinyl alcohol or other equivalent materials.

Apart from the use of monomers having desired functionality, functionality can be imparted to the resin particles in various other ways, generally characterized by modification of one or both of the template particle surface and the copolymer resin surface. In a first technique, an ethylenically unsaturated compound carrying the additional desired functionality is adsorbed onto the surface of the template particles. The desired functionality is then imparted to the copolymer prepared in the template particles by bonding the compound carrying it to the copolymer surface during polymerization, followed by removal of the template material. This technique is illustrated in Examples 12 and 19 below.

In a second technique, the surface of the copolymer particles is functionalized by adding to the polymerizable reaction mixture a compound carrying the desired functionality. The template particles are previously modified with complementary functional groups capable of associating with the functionality of the added compound. The functional groups of the added compound are then populated on the surface of the copolymer particles during the polymerization and thereafter. This process is illustrated in Examples 20 and 22 below.

In a third technique, the surface of the copolymer is functionalized by chemically bonding a compound containing the desired functionality onto the template particles. This functionality is then transferred to the copolymer during polymerization and removal of the template material. This technique is illustrated in Example 21 below.

The functionality to be imparted to the copolymer by any of the foregoing techniques can be polar or nonpolar, or can be of a type providing a site for subsequent ion exchange functionalization. For example, providing a chloromethyl group on the copolymer allows subsequent treatment with amines to form anion exchange resins. Alternatively, a strongly basic anion exchange resin can be produced by selecting, for the polymerization in the template particles, a monomer having a tertiary amine group, the resulting groups in the copolymer then being quarternized with an alkyl halide. Of course, if the amino groups incorporated into the copolymer are primary or secondary, the resulting ion exchange resin will be weakly basic.

Strongly acidic cation exchange resins may be produced by treating the crosslinked copolymer with concentrated sulfuric acid. Weakly acidic cation exchange resins may be produced by hydrolyzing a crosslinked, acrylic-ester version of the templated resin particles with an alkali metal hydroxide solution, to form carboxylic acid groups.

Generally, the particle size, porosity and surface area obtained will determine the applications for the resin particles of the invention, and these characteristics can be predetermined by selection of the template particles. Accordingly, the invention provides an efficient and economical method of producing uniform, substantially nonagglomerated copolymer particles having a wide variety of industrial and other uses.

The following examples further illustrate the invention. Unless otherwise indicated, all parts and percentages are by weight, temperatures are in degrees Celsius and reagents are of good commercial quality.

DESCRIPTION OF FIGURES

FIG. 1 shows scanning electron micrographs of the template resin and the silica gel template. FIG. 1 demonstrates the resemblance between the shape and size of the silica and its templating resin where even much of the exterior details are preserve.

EXAMPLES

PREPARATION OF HYDROPHOBIC SILICA GELS BY SILANIZATION (A) $C_4$ - SILICA GEL

Figure 1A:
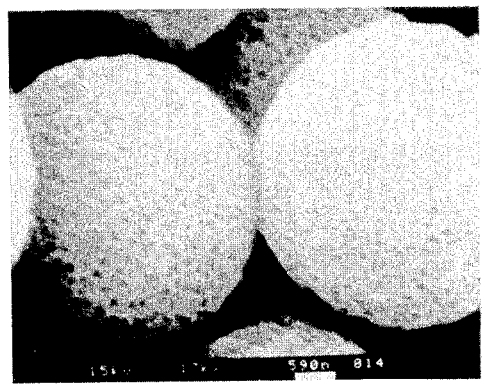
FIG. 1A shows the resin prepared following Example 2; Series 82 (Supelco, Inc.) silica gel was used as the template material.
Figure 1B:
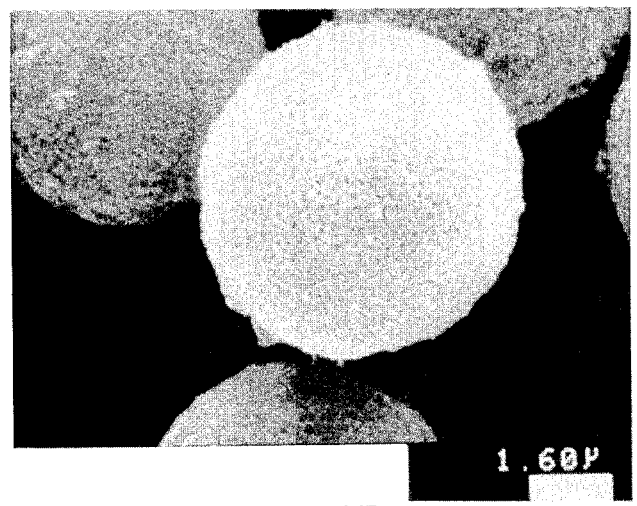
FIG. 1B shows the Series 82 silica template. This template is a spherical, 5-um, porous silica gel. The similarity of the imprinted resin can be observed in the details of the exterior surface.
Figure 2A:
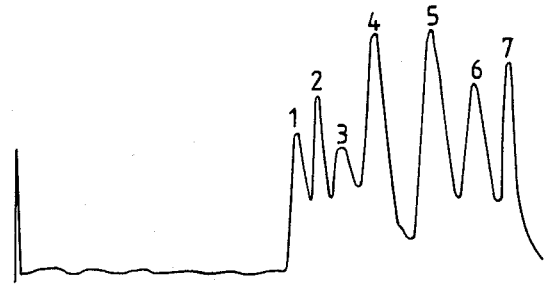
FIG. 2 shows two size-exclusion chromatographic (SEC) separations of a polystyrene mixture. For Figure 2A, column packed with the template materials, silica gel of Series 82 (Supelco, Inc.) was used, and for FIG. 2B a column packed with a styrene 40% divinylbenzene resin, prepared using the same silica as the template material following Example 2 was used. Peaks 1-6 are polystyrenes having molecular weights of 4480, 450, 50, 17.5, 4, and $0.89 \times 10^3$ dalton, respectively. Peak 7 is toluene. The columns are 15 cm long and 4.6 mm in internal diameter. The mobile phase is dichloromethane and the flow rate is 0.5 ml/min. The polymeric particles, when slurry packed at 5000 psi into a stainless steel tube are compressed with a loss of about 30% of the inter-particle volume, compared to the non-compressible silica gel column, which permits more polymeric particles to be forced into the same column space, providing a larger pore volume for SEC separations. This is evidenced by the larger resolution factors between bands of similar molecular sizes for the resin versus its template silica column. In this case, however, the resin and the silica show similar pore size distributions as indicated by a similar separation pattern.
Figure 2B:
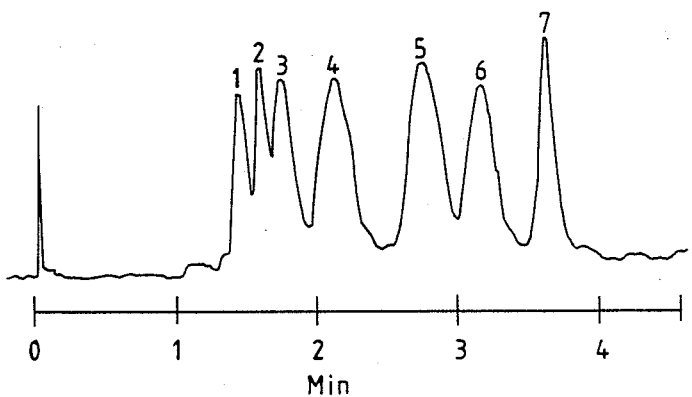
Figure 3:
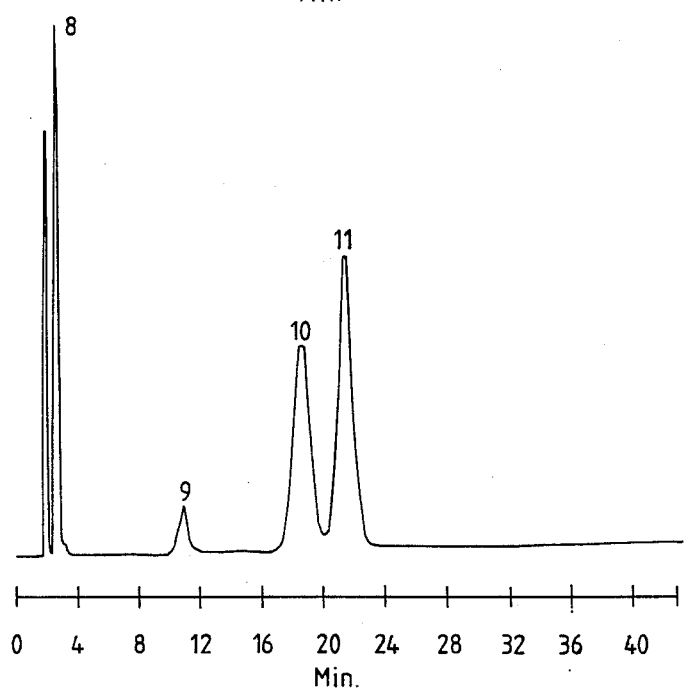
FIG. 3 is a chromatogram of acetaminophen (8), N,N-dimethylaniline (10), nitrobenzene (11), and an impurity (9) in compound 10, separated on a column packed with the resin of Example 12 below. The column is 15 cm long and 4.6 mm in internal diameter. The mobile phase is 35% acetonitrile 65% 0.1M $KH_2PO_4$, pH =3.85 and the flow rate is 1.0 ml/min. at ambient temperature. Under these conditions the chromatographic separation is of a type known as reversed phase chromatography, which illustrates a different kind of separation mechanism used in FIG. 2.

Twenty grams of Davisil 641 silica gel (W. R. Grace Co., Baltimore, MD —irregular particles with particle size 16-20 um; mean pore size 150A; distribution 40-300A; pore volume 1.10 ml/g; surface area 290 $m^2$/g; density 0.41 g/ml) were introduced to a 250 ml bottle, and the bottle was evacuated in an oven while gradually increasing the temperature to 150° C., which temperature was maintained for 4 hours. The bottle was removed from the oven and cooled down to room temperature in a dry desicator. To the silica 100 ml of dry toluene, 6.54 g (47 mmol) n-butyldimethylchlorosilane, and 8 ml of dry pyridine were added. The bottle was closed, shaken to mix and toppled top-to-bottom for 5 hours. The resulting slurry was filtered, washed thoroughly with toluene, methyl chloride and methanol. While filtering and washing, an excess of solvent was maintained in the bed to prevent drying and channeling. The material was then oven-dried at 60° C. overnight.

(B) $C_1$ - SILICA GEL

The preparation of (A) above was repeated in all essential respects, using 5.0 g trimethylchlorosilane in place of the n-butyldimethylchlorosilane.

(C) $C_2$ - SILICA GEL WITHOUT PYRIDINE

The preparation of (A) above was repeated in all essential respects, using 5.0 g of hexamethyldisilazane in place of the n-butyldimethylchlorosilane and pyridine.

EXAMPLE 1

To a 500 ml Parr bottle, 10 grams of $C_4$-silica gel (prepared as in (A) above) and 100 ml of distilled water were added. The mixture was aerated with nitrogen gas for 15 minutes and 10 ml of a mixture of 49:49:2 styrene: 80% pure divinylbenzene (DVB): t-butyl peroxybenzoate, freshly prepared by passing through a butylcatechol remover (Scientific Polymer, Ontario, NY) were added. The mixture was shaken vigorously for 4 hours at room temperature on a Parr instrument. 150 ml of 0.75% polyvinyl alcohol (MW 1000 dalton) was added, and the mixture was shaken for another 4 hours. While shaking for 24 hours, the suspension was heated to 120°

C. The suspension was then cooled to room temperature, filtered and washed with 100 ml water followed by 50 ml methanol. The precipitate was added to 500 ml of 3N sodium hydroxide in 40% aqueous methanol and shaken to 14 hours at room temperature to dissolve the $C_4$ silica gel. The product beads were filtered, washed with water to neutrality, washed with 100 ml methanol, and oven-dried at 60° C. The properties of the templated resin product as compared with the templating silica (silanized silica gel) are given in Table 1 below.

TABLE I

Properties of the Silicas Used As Templates and the BET Surface Areas Measured for the Resins, including Examples 1–20

| | SILICA TEMPLATE | | | | TEMPLATED RESIN PRODUCT | | | |
|---|---|---|---|---|---|---|---|---|
| | Pore Vol. (gr/ml) | Average Pore Size Angstrom | Surface ($m^2$gr) | Example | Silanized Silica | Monomers & Initiator[a] | Surface Area ($m^2$/gr) Measured | Calc |
| Series 82(550)[b] | 0.45 | 110 | 145 | — | $C_4$— | ST/DVB/67 61.5:36.5:2 | 369 | 378 |
| | | | | | $C_4$— | ST/DVB/67 49:49:2 | 419 | |
| Series 82(750)[b] | 0.48 | 110 | 125 | — | $C_4$— | ST/DVB/67 49:49:2 | 430 | 331 |
| Hypersil[c] | 0.61 | 100 | 160 | 2 | $C_4$— | ST/DVB/TBPB 49:49:2 | 431 | 296 |
| | | | | 7 | $C_4$ | PTMA/DVB/TBPB 49:49:2 | 515 | |
| | | | | 12[g] | $C_1$— | VPy/ST/DVB/TBPB 12.6:42.6:42.6:2 | 433 | |
| Davisil 641[d] | 1.10 | 150 | 290 | — | $C_4$— | ST/DVB/TBPB 73.3:24.7:2 | 218 | 416 |
| | | | | — | $C_4$— | ST/DVB/TBPB 61.5:36.5:2 | 375 | |
| | | | | 1 | $C_4$— | ST/DVB/TBPB 49:49:2 | 473 | |
| | | | | 5 | $C_4$— | CMST/DVB/88 49:49:2 | 351 | |
| | | | | 6 | $C_4$— | PTMA/DVB/TBPB 49:49:2 | 538 | |
| | | | | 10 | $C_4$— | VAC/TAIC/TBPB 49:49:2 | 326 | |
| Series 100[e] | 0.49 | 75 | 210 | 3 | $C_4$— | ST/DVB/TBPB 49:49:2 | 415 | 466 |
| | | | | 8 | $C_4$— | PTMA/DVB/TBPB 49:49:2 | 480 | |
| | | | | 13 | $C_1$— | ST/DVB/TBPB 49:49:2 | 469 | |
| | | | | 14 | $C_1$— | CMST/DVB/67 49:49:2 | 332 | |
| | | | | 15 | $C_1$— | PTMA/DVB/TBPB 49:49:2 | 508 | |
| | | | | 16 | $C_4$— | PTMA/EGDMA/TBPB 58.8:39.2:1.96 | 242 | |
| | | | | 17 | $C_4$— | DVB/GCMA/TBPB 39.2:58.8:1.96 | — | |
| | | | | 18 | NO | PTMA/EGDMA/86 49:49:2 | 174 | |
| | | | | 19 | NO | DDAH/EGDMA/PTMA/86 17:40.5:40.5:2 | 255 | |
| Series 100H[f] | 0.59 | 400 | 35 | 4 | $C_4$— | ST/DVB/TBPB 49:49:2 | 110 | 66 |
| | | | | 9 | $C_4$— | CMST/DVB/67 49:49:2 | 164 | |
| | | | | 11 | $C_4$— | VPr/TAIC/TBPB 49:49:2 | 175 | |

[a]For VAZO 67 (E. I. duPont de Nemours, Wilmington, DE) and VA-86 (Wako Pure Chemical Industries, Tokyo, Japan) polymerization was performed at 85° C./24 hrs; and at 120° C./24 hrs for t-butyl peroxybenzoate. For VAZO 88 (E. I. duPont) it was performed at 100° C./24 hours.
ST: Styrene
DVB: Divinyl benzene (80% purity)
PTMA: Pentaerythritol trimethacrylate
CMST: Chloromethyl styrene
VAc: Vinyl acetate
VPr: Vinyl propionate
VPy: 4-Vinyl pyridine
EGDMA: Ethylene glycol dimethacrylate
DDHA: 62% Aqueous diallyldimethyl-ammonium hydroxide
GCMA: Glycidyl methacrylate
FX-14: N-2-(N-ethylperfluoroocatne-sulfonamido)ethyl methacrylate (3M Industrial Chemical Products Division, St. Paul, MN)
TAIC: Triallyl isocyanurate
AC: Acrylate
TBPB: Tert-butyl peroxybenzoate
67: vazo 67: 2,2'-Azobis(isobutyronitrile)
88: vazo 88: 1,1'-Azobis(cyclohexanecarbonitrile)
86: VA-86: 2,2'-Azobis(2-methyl-N-(2-hydroxyethyl)propionamide

TABLE I-continued

Properties of the Silicas Used As Templates and the BET
Surface Areas Measured for the Resins, including Examples 1-20

| SILICA TEMPLATE | | | | TEMPLATED RESIN PRODUCT | | | |
|---|---|---|---|---|---|---|---|
| Pore Vol. (gr/ml) | Average Pore Size Angstrom | Surface ($m^2$gr) | Example | Silanized Silica | Monomers & Initiator[a] | Surface Area ($m^2$/gr) Measured | Calc |

[b]Series 82 (Supleco, Inc., Bellefonte, PA) experimental product, spherical, 5 micron particles. A 0.4 ml of monomers per 1 gr silica was used in the templating polymerization.
[c]Hypersil (Shandon Souther Products Ltd., Chesire, UK) spherical, 5 micron particles. A 0.6 ml of monomers per 1 g silica was used in the templating polymerization.
[d]Davisil 641 (W. R. Grace, Baltimore, MD) irregular, 16-20 micron particles. A 1.0 ml of monomers per 1 g silica was used in the templating polymerization.
[e]Series 100 (Supleco, Inc., Bellefonte, PA) experimental product, spherical, 5 micron particles. A 0.50 ml of monomers per 1 g silica was used in the templating polymerization.
[g]The pore size (volume) distribution of polymer:

| pore diameter (Angstrom) | pore volume (ml/g) |
|---|---|
| <60 | 0.005 |
| 60-80 | 0.516 |
| 80-100 | 0.309 |
| >100 | 0.086 |

EXAMPLE 2

Example 1 was repeated in all essential respects except for substitution of Hypersil silica gel (Shandon Southern Products, Ltd., Cheshire, England) in preparation of the $C_4$ silica gel and used 10 g of the $C_4$ silica gel material and 6.0 ml monomers/initiator mixture. The properties of the templated resin product as compared with the template resin (silanized silica gel) are set forth in Table II below. Samples of these resins were heated at conditions under which their organic material burns off to leave an ash residue of their inorganic content. Table 11 summarizes results for resins prepared according to the present example, with different conditions for the $C_4$-silica digestion. The results confirm that complete removal of the silica gel takes place under at least two of these conditions, leaving no inorganic ash.

TABLE II
ANALYSIS OF RESIDUAL INORGANIC MATERIAL IN CO-POLYMER

| Example[a] | Hydrolysis Method | % Weight Loss After 550° C./4 hrs |
|---|---|---|
| 2 | 30% aq. MeOH 3N NaOH 24 hrs/RT | 99.5 ± 0.05 |
| 2 | 30% aq. MeOH 3N NaOH 6 hrs/60° C. | 98.6 |
| 2 | 70% aq. HF 24 hrs/RT | 99.9 |

[a]A 0.75–0.95 g sample of Example 2 from a 5 um templated $C_4$—Hypersil was used for ash residue determination.

EXAMPLE 3

Example 1 was repeated in all essential respects except for substitution of Series-100 silica gel (Supelco, Inc.) in preparation of the $C_4$ - silica gel, and use of 10 g of the $C_4$ - silica gel material and 5.0 ml monomers/initiator mixture. The properties of the templated resin product as compared with the templating silica (silanized silica gel) are set forth in Table I above.

EXAMPLE 4

Example 1 was repeated in all essential respects except for substitution of Series 100 H silica gel (Supelco, Inc.) in preparation of the $C_4$ - silica gel, and use of 10 g of the $C_4$ silica gel material and 5.8 ml of monomers-/initiator mixture. The properties of the templated resin product as compared with the templating silica (silanized silica gel) are set forth in Table I above.

EXAMPLE 5

Example 1 was repeated in all essential respects except for substitution of 49:49:2 of chloromethylstyrene: divinylbenzene: 1,1'-Azobis (cyclohexanecarbonitrile) for the monomers/initiator mixture of Example 1 and heating to 85° C. instead of 120° C. The properties of the templated resin product as compared with the templating silica (silanized silica gel) are set forth in Table 1 above.

EXAMPLE 6

Example 1 was repeated in all essential respects except for substitution of 49:49:2 pentaerythritoltrimethacrylate: divinylbenzene: tert-butyl peroxybenzoate for the monomers/initiator mixture of Example 1. The properties of the templated resin product as compared with the templating silica (silanized silica gel) are set forth in Table I above.

EXAMPLE 7

Example 2 was repeated in all essential respects except for substitution of the monomers/initiator mixture of Example 6 for the comparable materials of Example 2. The properties of the templated resin product as compared with the templating silica (silanized silica gel) are set forth in Table I above.

EXAMPLE 8

Example 3 was repeated in all essential respects except for substitution of the monomers/initiator mixture of Example 6 for the comparable materials of Example 3. The properties of the templated resin product as compared with the templating silica (silanized silica gel) are set forth in Table I above.

EXAMPLE 9

Example 4 was repeated in all essential respects except for substitution of the monomers/initiator mixture of Example 5 for the comparable materials of Example 1. The properties of the templated resin product as compared with the templating silica (silanized silica gel) are set forth in Table I above.

EXAMPLE 10

Example 1 was repeated in all essential respects except for substitution of 25% NaCl aqueous solution (suspending solvent) for the water and the 0.75% polyvinyl alcohol solution of Example 1. The monomer/initiator mixture was a solution of 49:49:2 vinyl acetate: triallyl isocyanurate: tert-butyl peroxybenzoate. The properties of the templated resin product as compared with the templating silica (silanized silica gel) are set forth in Table I above.

EXAMPLE 11

Example 4 was repeated in all essential respects except for substitution of 49:49:2 vinyl propionate: triallyl isocyanurate: tert-butyl peroxybenzoate for the comparable materials of Example 4. The properties of the templated resin product as compared with the templating silica (silanized silica gel) are set forth in Table I above.

EXAMPLE 12

Example 2 was repeated in all essential respects except for substitution of 12.6:42.6:42.6:2 4-vinylpyridine: styrene: divinylbenzene: tert-butyl peroxybenzoate for the monomers and initiator of Example 2. After the polymerization, the silica gel was removed by dispersion of the product in 50 ml 70% aqueous HF solution instead of the 3N sodium hydroxide, followed by filtration, water washing to neutrality, 3N sodium hydroxide treatment, and with water washing again to neutrality. The properties of the templated resin product as compared with the templating silica (silanized silica gel) are set forth in Table I above.

EXAMPLE 13

Example 3 was repeated in all essential respects except for substitution of 10 grams of the $C_1$-Series 100 silica gel and use of 5.0 ml of the monomer-initiator mixture. The properties of the templated resin product as compared with the templating silica (silanized silica gel) are set forth in Table I above.

EXAMPLE 14

Example 5 was repeated in all essential respects except for substitution of 10 g of the $C_1$-Series 100 silica gel and 5.0 ml of the monomer-initiator mixture. The properties of the templated resin product as compared with the templating silica (silanized silica gel) are set forth in Table I above.

EXAMPLE 15

Example 6 was repeated in all essential respects except for substitution of 10 g of the $C_1$-Series 100 silica gel and 5.0 ml of the monomer-initiator mixture. The properties of the templated resin product as compared with the templating silica (silanized silica gel) are set forth in Table I above.

EXAMPLE 16

Example 3 was repeated in all essential respects except for substitution of 58.8:39.2:1.96 pentaerythritol trimethacrylate: ethylene glycol dimethacrylate: tert-butyl peroxybenzoate for the comparable materials of Example 3. The properties of the templated resin product as compared with the templating silica (silanized silica gel) are set forth in Table I above.

EXAMPLE 17

Example 3 was repeated in all essential respects except for substitution of 58.8:39.2:1.96 glycidyl methacrylate: divinylbenzene: tert-butyl peroxybenzoate for the comparable materials of Example 3. The properties of the templated resin product as compared with the templating silica (silanized silica gel) are set forth in Table I above.

EXAMPLE 18

To a 500 ml Parr bottle were added 10 g of Series 100 silica gel (Supelco, Inc.) and 200 ml of isooctane. The mixture was aerated with nitrogen gas for 15 minutes and 5 ml of a mixture of 5.0 g of ethylene glycol dimethacrylate containing 5% water, 5.0 g penterythritol trimethacrylate and 0.2 g of VA-86 initiator (2,2-Azobis(2-methyl-N-(2-hydroxyethyl)propionamide) from Wako Pure Chemical Industries, Ltd.) was added. The mixture was shaken vigorously for 18 hours. Then, while shaking, the suspension was heated to 85° C. for 6 hours, followed by 100° C. for 18 hours. The mixture was then cooled to room temperature, filtered, and the precipitate washed with toluene, methylene chloride, methanol and water. The precipitate was added to 500 ml of 3N sodium hydroxide in 40% aqueous methanol and shaken for 24 hours at room temperature to dissolve the silica gel. The product beads were filtered, washed with water to neutrality, washed with 100 ml methanol, and oven-dried at 60° C. The properties of the templated resin product as compared with the templating silica (silanized silica gel) are set forth in Table I above.

EXAMPLE 19

Example 18 was repeated in all essential respects except for substitution of 17:40.5:40.5:2 62% aqueous diallyldimethylammonium hydroxide: ethylene glycol dimethacrylate: pentaerythritol trimethacrylate: VA-86 initiator for the monomers/initiator mixture. The properties of the templated resin product as compared with the templating silica (silanized silica gel) are set forth in Table I above.

EXAMPLE 20

Step 1

Preparation of modified diol-CF Silica Gel

To 15 g of Supelcosil LC-diol (a silica gel surface-modified with a silane-bonded alkoxy alkanediol, from Supelco, Inc.) placed in a 250 ml bottle was added 50 ml of pyridine, 50 ml of methylene chloride, and 2.5 g of 4-dimethylaminopyridine and 4.5 g heptafluorobutyryl chloride. The bottle was closed and shaken for 12 hours. The slurry was filtered, washed thoroughly with acetone, methanol, water and methanol. The material was finally air dried.

Step 2

Preparation of Templated Resin

To a 500 ml Parr bottle was added 11.2 g of the modified silica diol-CF of step 1 and 150 ml of distilled water. The mixture was aerated with nitrogen gas for 15 minutes, and 5 ml of a 23.7:29.8:44.6:1.9 FX-14: pentaerythritol trimethacrylate: divinylbenzene: tert-butyl peroxybenzoate mixture was added. The mixture was shaken vigorously on a Parr instrument for hours and 150 ml of 0.75% aqueous polyvinyl alcohol was added while the shaking was continued for another 14 hours. Then while shaking, the suspension was heated and held at 120° C. for 24 hours. The mixture was cooled to room temperature, filtered, and the precipitate was washed with toluene, methylene chloride, methanol and water. The precipitate was added to 500 ml of 3N sodium hydroxide in 40% aqueous methanol and shaken for 24 hours at room temperature to dissolve the silica gel. The product beads were filtered, washed with water to neutrality, followed by washing with 100 ml methanol, and air-dried at room temperature. (FX-14 is N-2-(N-ethylperfluorooctanesulfonamide)ethyl methacrylate from 3M Company, St. Paul, MN.)

EXAMPLE 21

Step 1

Preparation of hydroxyl bonded silica gel

To 20 g of Series 100 silica gel (Supelco, Inc.) was added 6.80 g of a 62% alcoholic solution of N,N-bis(2-hydroxyethyl)-3-aminopropyltriethoxysilane and 250 ml of toluene. The mixture was refluxed and 50 ml of the first distillation was azeotropically removed, followed by 5 hours of reflux. The mixture was filtered and thoroughly washed with toluene, methylene chloride, and methanol. The white product was oven-dried at 60° C. under nitrogen.

Step 2

Preparation of modified diol-AC

Example 20, Step 1 was repeated in all essential respects using acryloyl chloride (AC) in place of the heptafluorobutyryl chloride (CF) and the product of Step 1 of this Example 21 in place of Supelcosil LC-diol.

Step 3

Preparation of Templated Resin

Example 18 was repeated in all essential respects except for substitution of the modified diol-AC of Step 2 above for the silica gel of Example 18.

EXAMPLE 22

10g of Supelcosil LC-SAX ( a silica gel surface-modified with silane-bonded quaternary ammonium functionality, from Supelco, Inc.), a strong anion exchanger, was suspended in 20 ml of water containing 3.5 g sodium sulfonated styrene for 30 minutes. The mixture was filtered and washed with water and methanol. The silica was dried under vacuum and suspended in 200 ml water containing 5.3 ml of 49:49:2 styrene: DVB: tert-butyl peroxybenzoate. The polymerization and the following steps where according to Example 20.

We claim:

1. A porous, rigid resin comprising particles of crosslinked copolymer derived from monoethylenically unsaturated monomers and polyethylenically unsaturated crosslinking monomers, said copolymer resulting from polymerization, in the pores of porous inorganic template particles, of a reaction mixture comprising said monomers and a polymerization initiator in a liquid medium in which the monomers and initiator are phase separable and extractable therefrom into the pores of the template particles, followed by removal of the template particles without destruction of the copolymer, whereby the isolated copolymer mirrors the size, surface area and porosity of the template particles.

2. The resin of claim 1 wherein the template particles are selected from a porous silica gel, alumina, zirconia, a mineral, and a refractory material.

3. The resin of claim 1 wherein the monomers, the initiator and the template particles are hydrophobic, and the reaction mixture comprises an aqueous medium.

4. The resin of claim 1 wherein the monomers, the initiator and the template particles are hydrophilic, and the reaction mixture comprises a hydrophobic suspending medium.

5. The resin of claim 3 wherein the template particles comprise silanized silica gel particles and the reaction medium is aqueous.

6. The resin of claim 5 wherein the silanization is effected with a trialkyl ($C_1$-$C_{18}$) halosilane.

7. The resin of claim 5 wherein the silica gel has an average pore size from about 3 to about 2000 nm, a porosity of at least 30% and a surface area from about 5 to about 1000 $m^2$/g.

8. The resin of claim 1 wherein the copolymer carries polar functionality.

9. The resin of claim 8 where in the polar functionality is cationic.

10. The templated resin of claim 9 wherein the cationic functionality comprises pyridinyl groups.

11. The resin of claim 8 wherein the polar functionality is anionic.

12. The resin of claim 1 wherein the monoethylenically unsaturated monomers are selected from aromatic monomers, acrylic monomers, or mixtures of aromatic and acrylic monomers.

13. The resin of claim 1 wherein the copolymer is a styrenic copolymer.

14. The resin of claim 1 wherein the styrenic copolymer is a copolymer of styrene and divinylbenzene.

15. The resin of claim 1 wherein the copolymer is an acrylic copolymer.

16. The resin of claim 1 wherein the acrylic copolymer is copolymer of divinylbenzene and an alkyl ($C_1$-$C_8$) acrylate of methacrylate.

* * * * *

UNITED STATES PATENT AND TRADEMARK OFFICE
CERTIFICATE OF CORRECTION

PATENT NO. : 4,933,372
DATED : June 12, 1990
INVENTOR(S) : Binyamin Feibush et al.

It is certified that error appears in the above-identified patent and that said Letters Patent is hereby corrected as shown below:

Claim 14, Column 16, line 48, reads "claim 1"

It should read -- claim 13 --.

Signed and Sealed this

Twentieth Day of August, 1991

*Attest:*

HARRY F. MANBECK, JR.

*Attesting Officer*  *Commissioner of Patents and Trademarks*